United States Patent
Puig Vilá et al.

(10) Patent No.: US 9,855,738 B2
(45) Date of Patent: Jan. 2, 2018

(54) METHOD FOR CONTROLLING THE OPERATION OF A PRINTING PRESS AND A FLEXOGRAPHIC PRINTING PRESS FOR IMPLEMENTING SAID METHOD

(71) Applicant: COMEXI GROUP INDUSTRIES, S.A., Rudellots de la Selva, Girona (ES)

(72) Inventors: Jordi Puig Vilá, Girona (ES); Alfonso Corgacho Tejada, Girona (ES); Sebastià Bota Oliveras, Girona (ES)

(73) Assignee: COMEXI GROUP INDUSTRIES, S.A.U., Rudellots de la Selva (Girona) (ES)

( * ) Notice: Subject to any disclaimer, the term of this patent is extended or adjusted under 35 U.S.C. 154(b) by 0 days.

(21) Appl. No.: 15/293,684

(22) Filed: Oct. 14, 2016

(65) Prior Publication Data
US 2017/0028709 A1    Feb. 2, 2017

Related U.S. Application Data

(63) Continuation-in-part of application No. 14/237,349, filed as application No. PCT/ES2012/000281 on Aug. 9, 2012, now abandoned.

(30) Foreign Application Priority Data

Aug. 12, 2011 (ES) .................................. 201100919

(51) Int. Cl.
*B41F 33/00* (2006.01)
*B41F 3/44* (2006.01)

(52) U.S. Cl.
CPC ............ *B41F 33/0036* (2013.01); *B41F 3/44* (2013.01)

(58) Field of Classification Search
CPC .............. B41F 33/0081; B41F 33/0036; B41F 33/0045; B41F 3/44; B41F 13/025
See application file for complete search history.

(56) References Cited

U.S. PATENT DOCUMENTS

| | | | | |
|---|---|---|---|---|
| 5,636,330 A | * | 6/1997 | Barak | ................ B41F 33/0027 358/1.1 |
| 2002/0050219 A1 | * | 5/2002 | Hunold | ................... B41F 13/14 101/484 |

(Continued)

FOREIGN PATENT DOCUMENTS

| CA | 2557680 A1 | 2/2007 |
|---|---|---|
| CA | 2592528 A1 | 1/2009 |

(Continued)

*Primary Examiner* — David Banh
(74) *Attorney, Agent, or Firm* — Robert J. Hess; Hess Patent Law Firm

(57) ABSTRACT

The present invention relates to a method for controlling the operation of a printing press and a flexographic printing press for implementing said method, wherein the method comprises performing the following steps: a) capturing information from at least one image printed by said printing press; and b) comparing said information captured from said printed image with at least some digital-format information predetermined in prepress, or digital prepress information, including at least one part of the image to be printed. The method comprises adjusting the pressure and/or register setting of one or more printing units of the printing press, using at least the result of the comparison in said step b). The press is designed in order to implement the method.

16 Claims, 1 Drawing Sheet

(56) References Cited

U.S. PATENT DOCUMENTS

| | | | |
|---|---|---|---|
| 2003/0005840 A1 | 1/2003 | Poelter et al. | |
| 2004/0163562 A1* | 8/2004 | Lewis, Jr. | B41F 33/0081 |
| | | | 101/485 |
| 2005/0199151 A1 | 9/2005 | Holten et al. | |
| 2006/0285181 A1 | 12/2006 | Fukui | |
| 2007/0272106 A1 | 11/2007 | Hauck et al. | |
| 2008/0173195 A1* | 7/2008 | Vidaillac | B41F 13/025 |
| | | | 101/142 |
| 2008/0298825 A1* | 12/2008 | Huber | B41F 33/0045 |
| | | | 399/39 |
| 2011/0297026 A1* | 12/2011 | Zeinhofer | B41F 13/025 |
| | | | 101/481 |
| 2012/0145018 A1* | 6/2012 | Elkinson | B41F 33/0045 |
| | | | 101/135 |

FOREIGN PATENT DOCUMENTS

| | | |
|---|---|---|
| DE | 102008031995 | 1/2009 |
| EP | 0863002 A1 | 9/1998 |
| EP | 2119565 A2 | 11/2009 |
| EP | 1144855 A2 | 11/2011 |
| WO | WO 2013/024185 | 2/2003 |
| WO | WO 2005/102702 A1 | 11/2005 |

\* cited by examiner

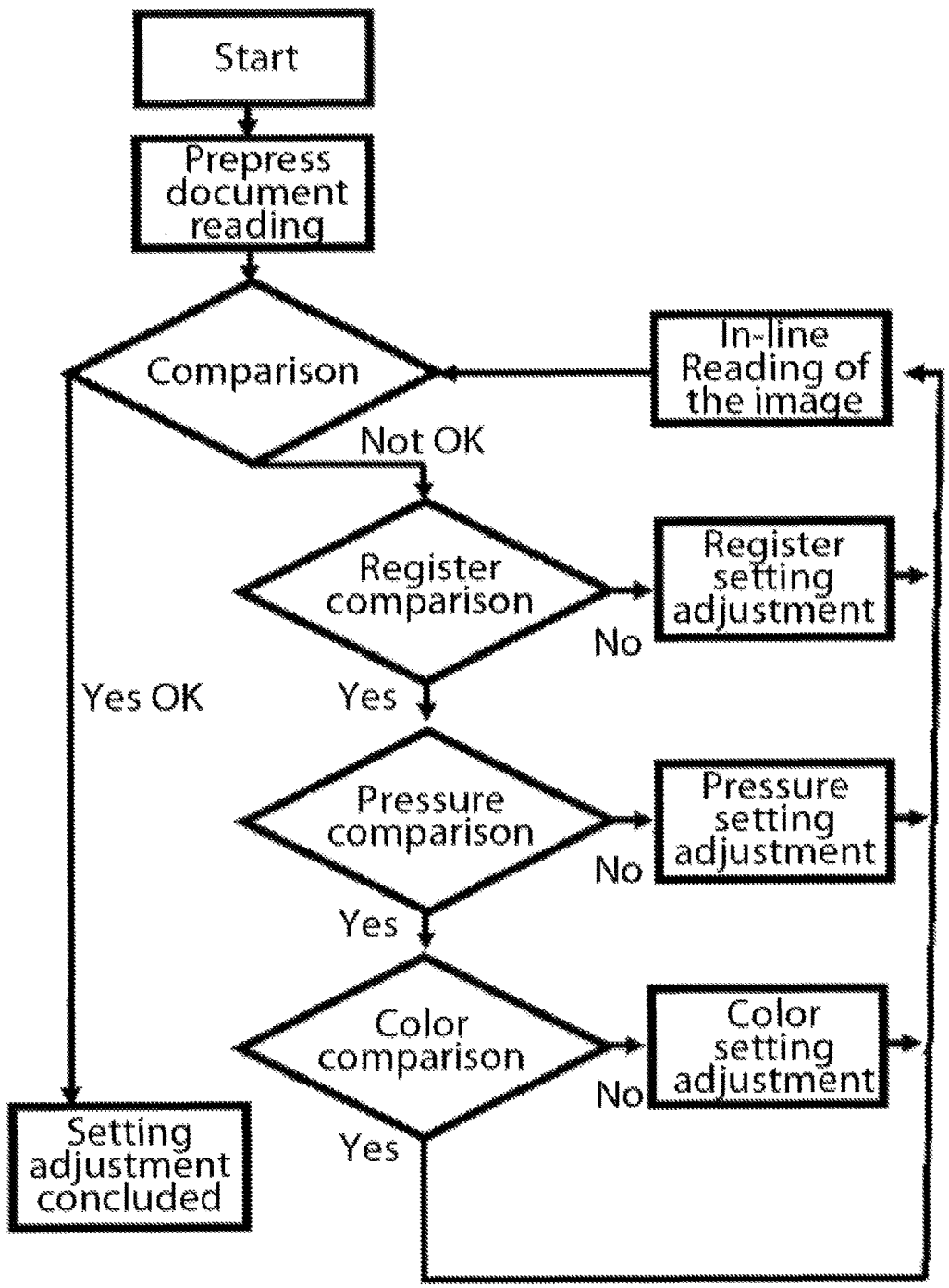

METHOD FOR CONTROLLING THE OPERATION OF A PRINTING PRESS AND A FLEXOGRAPHIC PRINTING PRESS FOR IMPLEMENTING SAID METHOD

FIELD OF THE ART

The present invention generally relates in a first aspect to a method for controlling the operation of a printing press, which comprises comparing prepress information with information from a printed image, and more particularly to a method which comprises using the result of said comparison to adjust a side and/or longitudinal register and/or pressure setting.

The invention is particularly applicable to controlling the operation of a flexographic press.

A second aspect of the invention relates to a flexographic printing press designed in order to implement the method of the first aspect.

STATE OF THE PRIOR ART

The pressure and register setting adjustments that are currently performed for the purpose of printing a new printing job are performed in different manners:

Manually:
1.—The operator manually registers the side/longitudinal registers and pressures.

Automatically:
1.—Automatic setting adjustments with marks formed by either a single dot or by different marks.
2.—Automatic setting adjustment without marks, analyzing the printing coverage %.
3.—"Offline" automatic setting adjustment carried out by means of theoretical calculations of both register and diameters (topography).

The application of comparing a prepress image that is in the form of a pdf document, tiff document or the like, with the image being taken in production at that time is known. In reality, what is actually done is that the defects that may have various origins are detected.

Application US 2007272106 A1 discloses a method and apparatus for controlling operating processes or measuring processes associated with a printed image applied to a printing material, which comprises comparing in a computer a prepress image with an image captured from the printed image with the printing material displayed on a desk, and triggering operating processes or measuring processes depending on the elements identified in the printed image as a result of said comparison.

US 2007272106 A1 does not propose using the result of said comparison at all to adjust the settings of the elements making up the printing press.

U.S. Pat. No. 6,382,101 B1 proposes a method for aiding remote ink fountain selection which comprises comparing the digitized image of a printed image with an identified sample image for the purpose of supplying the identification of the sample image when the comparison provides a match. For one embodiment, the sample image is a prepress image with its corresponding identification information.

U.S. Pat. No. 6,382,101 B1 does not propose using the result of said comparison for purposes other than those which relate to the ink fountain selection.

DESCRIPTION OF THE INVENTION

It is necessary to offer an alternative to the state of the art which covers the deficiencies found therein, particularly those relating to the known limited uses benefitting from the comparison of printed images with prepress images.

To that end, a first aspect of the present invention provides a method for controlling the operation of a printing press, selected from the group consisting of a flexographic printing press, an offset printing press, and a rotogravure printing press, said printing press integrating several printing units, in which method a digital prepress information is provided, comprising several digital files, or one digital file subdivided into several digital files, each of said digital files corresponding to a digital layer including information referred to the color to be printed and shapes to be printed by one of said printing units in said color, wherein said method comprises performing the following steps:

a) provide each printing unit with a single printing ink and with a single printing plate including shapes to be printed in a single color that corresponds to the shapes included in one of said digital layers;

b) perform, in response to time or position instructions provided to the printing units, a test print operation wherein each printing unit is operated in a different sequential time or at least two of said printing units are operated simultaneously performing a plurality of test print operations in different longitudinal or transversal positions in the printing direction, producing test printed images;

c) capturing information from said test printed images including specific color information and printed shape information;

d) associating automatically each shape printed in each color with a printing unit of the printing press having printed this shape of this color by analyzing the information captured during step c) and the time or position instructions provided to the printing units during step b); and e) further comparing said information captured from said printed image with each single digital layer detecting similarities between the shape of the captured information and the shapes included in said digital layers, and assigning each digital layer to the printing unit associated to the most similar color information and printed shape information.

Step d) allow the automatic detection of which printing unit print each shape, and the color used in said printing, detecting the correspondence between the printing time instructions and the time in which each information is captured or detecting the correspondence between the captured information. Step e) allows the automatic detection of which printing unit print the shapes included in which digital layer.

Said method can also include detecting differences between the color information existing in the prepress digital file and the color information captured during step c), and adjusting the pressure and/or the color setting of the printing unit of said printing press associated during step e) with said color information captured during step c) with detected differences, correcting the printed color deviations.

Unlike conventional methods, the method proposed by the present invention comprises adjusting the pressure and/or register setting of at least one printing unit of said printing press, using at least the result of the steps c) and e).

The proposed method can include detecting differences between the relative position of different motifs existing in the prepress digital file and the printed form information captured during step c), and adjusting the longitudinal or transversal positions in the printing direction with register setting of the printing unit of said printing press associated during step e) with said color information captured during step c) with detected differences. This feature allows the detection of record errors (misalignments of the images printed with each printing unit), and its correction.

For one embodiment, said digital prepress information includes non-printable digital information that is complementary to the digital information of the image to be printed; the method comprising using said non-printable digital information for controlling the performance of said comparison of step b).

According to one embodiment, said information capture of step a) is performed in line with the printing process.

In addition to said longitudinal and transverse register and pressure setting adjustments, the method proposed by the present invention further comprises adjusting a color setting, using at least the result of the comparison in said step b), for which purpose said information captured in step a) includes specific color information, for one embodiment the method comprising using an image acquisition device in combination with a spectrophotometer to perform said information capture of step a).

For one embodiment of the method proposed by the present invention, specific labels indicating the positions of the zones where spectrophotometric readings are to be performed are downloaded from the digital prepress information.

According to one embodiment, said labels incorporate some additional associated information where the colorimetric format value to be achieved in the final print is included.

According to one embodiment, the printed image is read by means of a spectrophotometer in line with the press and a filter is applied to the colorimetric result to simulate an intermediate (laminated) material that is used for comparing with the desired final color.

The method comprises using an image acquisition device such as a matrix or RGB camera or an LCCD line scan camera to perform said step a).

As for the printing press, it is a printing press integrating several printing units, chosen from a group comprising a flexographic printing press, an offset printing press, or a rotogravure printing press.

For one embodiment, said digital prepress information comprises at least one file in a digital format chosen from a group comprising, among others, PDF files or TIFF files.

According to another embodiment, said digital prepress information used for adjusting the setting comprises several digital files, or one digital file sub-divided into several digital files, each of said digital files or subdivisions corresponding to a color of the final print, or to a different motif to be printed in a respective printing unit of the printing press with a certain color in the digital file.

According to one embodiment, the comparison of step b) of the method proposed by the present invention comprises performing one of the following actions:
assigning colors of the images or parts of the images to be compared with one another; and
determining the relative position of the side and longitudinal register for each color of the images or parts of the images to be compared with one another.

According to one embodiment, the way to assign the color comprises a standard color element chosen from a group comprising: color model (CIELAB), color value of 32 filters and PANTONE value.

According to one embodiment of the method, before performing comparison step b) the different colors existing in the prepress digital file are detected, and each printed form of each color is associated with each printing unit of the printing press.

For one embodiment, said assignment of colors of the images or parts of the images to be compared comprises performing an automatic assignment of each color of the digital prepress information with each color of a corresponding printing unit of the printing press, for example by means of a sequence of side or longitudinal register movements.

With respect to the aforementioned non-printable digital information, said information includes in said digital files reference elements comprising text labels or inserted graphical references which facilitate assigning each color of the digital prepress information, or prepress document, with each color provided by a corresponding printing unit of the printing press.

For one embodiment, said labels included in said digital files also provide information about the relative position of the side and longitudinal register for each color of said printing units of the printing press.

For one embodiment, said step a) of the method proposed by the present invention comprises sequential printing of different printing units, said sequential printing being able to be performed independently or in conjunction with different anilox (inking cylinder) and plate cylinder (printing cylinder) pressure setting combinations.

For one embodiment, said information captured from said printed image in step b) comprises a register micro-mark of the type used in plates for assembly in an assembly machine and where once the position of this register micro-mark in the digital prepress information is determined (automatically or manually where an operator marks in the digital prepress information the location of the zone where said register micro-mark is located), the printing unit to which each micro-mark corresponds is determined (for example by means of a print detection system that looks for these register micro-marks automatically), and once this correspondence is determined all these micro-marks are moved close to one another in a position where they all overlap, the side and longitudinal register setting of the image to be printed thus being adjusted which, depending on the embodiment, is performed on the press with all the groups printing at the same time or in an alternating manner with different printing units always taking a color as a reference mark with respect to the other colors.

For one embodiment, the comparison of step b) includes detecting a different color than what is expected, errors in a barcode or other codes, between the expected code and the printed code.

A second aspect of the present invention relates to a flexographic printing press, comprising:
a rotatable counter-pressure central cylinder and at least one printing cylinder and a inking cylinder that is rotatable and linearly movable;
drive means for carrying out said rotations;
drive means for carrying out said linear movements;
means for capturing information from at least one image printed by said printing press; and
a control unit in connection with said means for capturing information and with the capacity to store the digital prepress information.

The control unit of the flexographic printing press proposed by the second aspect of the invention integrates a comparison unit for comparing the printed image with the digital prepress information, and it is regulated and envisaged to implement a method according to the first aspect of the invention.

BRIEF DESCRIPTION OF THE DRAWINGS

The foregoing and other advantages and features will be better understood from the following detailed description of embodiments in reference to the attached drawing, which must be interpreted in an illustrative and non-limiting manner, in which:

FIG. 1 is a flowchart describing the different steps of the method proposed by the present invention for one embodiment.

DETAILED DESCRIPTION OF SEVERAL EMBODIMENTS

As indicated in the different boxes in the flowchart of FIG. 1, the method starts for the illustrated embodiment by means of the reading of the prepress document, and the reading in line of the printed image, both readings being compared in the dilemma indicated as "comparison".

If this comparison offers a satisfactory result, the setting adjustment is concluded, but if this is not the case, the path indicated by the terms "NOT OK" is followed, which entails performing respective register, pressure and color comparisons performed sequentially, one after the other, if the result of the comparisons is suitable.

If the result of any of these comparisons is not suitable, instead of continuing with the remaining comparisons, the corresponding register, pressure or color setting which did not offer a suitable result is adjusted, after which printing and a new in-line reading of the printed image are performed after the necessary setting adjustment or adjustments.

A person skilled in the art could introduce changes and modifications in the described embodiments without departing from the scope of the invention as it is defined in the attached claims.

The invention claimed is:

1. A method for controlling operation of a printing press, selected from the group consisting of a flexographic printing press, an offset printing press, and a rotogravure printing press, said printing press integrating several printing units, in which method a digital prepress information is provided, comprising several digital files, or one digital file subdivided into several digital files, each of said digital files corresponding to a digital layer including information referred to the color to be printed and shapes to be printed by one of said printing units in said color, wherein said method comprises performing the following steps:
   a) providing each printing unit with a single printing ink and with a single printing plate including shapes to be printed in a single color that corresponds to the shapes included in one of said digital layers;
   b) performing, in response to time or position instructions provided to the printing units, a test print operation wherein each printing unit is operated in a different sequential time or at least two of said printing units are operated simultaneously performing a plurality of test print operations in different longitudinal or transversal positions in the printing direction, producing test printed images;
   c) capturing information from said test printed images including specific color information and printed shape information;
   d) associating automatically each shape printed in each color with a printing unit of the printing press having printed this shape of this color by analyzing the information captured during step c) and the time or position instructions provided to the printing units during step b); and
   e) further comparing said information captured from said printed image with each single digital layer detecting similarities between the shape of the captured information and the shapes included in said digital layers, and assigning each digital layer to the printing unit associated to the most similar color information and printed shape information;
wherein said method include detecting differences between the color information existing in the prepress digital file and the color information captured during step c), and adjusting the pressure and/or the color setting of the printing unit of said printing press associated during step e) with said color information captured during step c) with detected differences;
wherein said method include detecting differences between the relative position of different motifs existing in the prepress digital file and the printed form information captured during step c), and adjusting the longitudinal or transversal positions in the printing direction with register setting of the printing unit of said printing press associated during step e) with said color information captured during step c) with detected differences;
said comparison of step e) including:
   detecting differences between colors captured from said printed image and digital-format information,
   determining the relative position of the side and longitudinal register for each color of the images or parts of the images to be compared with one another.

2. The method according to claim 1, wherein said digital prepress information includes non-printable digital information that is complementary to the information of the image printed; and
   controlling performance of said comparison in step e) with said non-printable digital information.

3. The method according to claim 1, wherein said information capture of said step c) is performed in line with a printing process.

4. The method according to claim 1, further comprising performing said information capture of step c) with a camera selected from the group consisting of a matrix camera, a RGB camera, an LCCD line scan camera in combination with a spectrophotometer.

5. The method according to claim 1, wherein said digital prepress information comprises at least one file in a digital format selected from the group consisting of PDF files and TIFF files.

6. The method according to claim 2, wherein said non-printable digital information which includes in digital files reference elements comprising text labels or inserted graphical references that facilitate assigning each color of the digital prepress information with each color provided by a corresponding printing unit of the printing press, and where said labels also provide information about the longitudinal and the transversal position for each color of said printing units in the printing direction.

7. The method according to claim 1, wherein said information captured from said printed image in step c) comprises a register micro-mark as in plates for assembly in an assembly machine, and wherein once a position of the register micro-mark is located, then the printing unit to which each micro-mark corresponds is determined, and once correspondence is determined all the micro-marks are moved close to one another into a position where all the micro-marks overlap, the side and the longitudinal register setting of the image to be printed being thus adjusted.

8. The method according to claim 7, wherein the adjusting of the setting is performed on the press with all the groups printing at the same time on in an alternating manner with different printing units always taking a color as a reference mark with respect to other colors.

9. The method according to claim 1, wherein said comparison in step e) includes detecting a different color than what is expected, because of errors in a barcode or other codes, between the expected code and the printed code.

10. The method according to claim 4, further comprising downloading, from the prepress information, specific labels that indicate positions of zones where spectrophotometric readings are to be performed, said specific labels incorporating some additional associated information where colorimetric format value to be achieved in the final print is included.

11. The method according to claim 4, wherein the printed image is read by means of a spectrophotometer in line with the press, further comprising applying a filter to a colorimetric result to use the filtered result for comparing with a desired final color.

12. The method according to claim 1, wherein the printing press regulated to implement the method is the flexographic printing press that comprises:
   a rotatable counter-pressure control cylinder and at least one printing cylinder and an inking cylinder that is rotatable and linearly movable;
   drive means for carrying out said rotations;
   drive means for carrying out said linear movements;
   means for capturing information from at least one image printed by said printing press; and
   a control unit in connection with said means for capturing information that has a capacity to store digital prepress information,
   wherein said control unit integrates a comparison unit for comparing a printed image with the digital press information.

13. The method according to claim 3, further comprising performing said information capture of step c) with a camera selected from the group consisting of a matrix camera, a RGB camera, an LCCD line scan camera in combination with a spectrophotometer.

14. The method according to claim 1, wherein said digital prepress information comprises at least one file in a digital format selected from the group consisting of PDF files and TIFF files.

15. The method according to claim 13 further comprising downloading, from the digital prepress information, specific labels that indicate positions of zones where spectrophotometric readings are to be performed, said labels incorporating some additional associated information where colorimetric format value to be achieved in the final print is included.

16. The method according to claim 13, further comprising reading the printed image by means of a spectrophotometer in line with the press, applying a filter to a colorimetric result to simulate an intermediate laminated material that is used for comparing with a desired final color.

* * * * *